(12) United States Patent
Lin et al.

(10) Patent No.: US 11,405,813 B2
(45) Date of Patent: Aug. 2, 2022

(54) RADIO LINK MONITORING (RLM) PROCEDURES IN NEW RADIO UNLICENSED BANDS (NR-U)

(71) Applicant: MEDIATEK INC., Hsinchu (TW)

(72) Inventors: Hsuan-Li Lin, Hsinchu (TW);
Chiou-Wei Tsai, Hsinchu (TW);
Tsang-Wei Yu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 136 days.

(21) Appl. No.: 16/992,812

(22) Filed: Aug. 13, 2020

(65) Prior Publication Data

US 2021/0051507 A1 Feb. 18, 2021

Related U.S. Application Data

(60) Provisional application No. 62/888,136, filed on Aug. 16, 2019, provisional application No. 62/910,589, filed on Oct. 4, 2019.

(51) Int. Cl.
| | |
|---|---|
| *H04W 24/10* | (2009.01) |
| *H04L 5/00* | (2006.01) |
| *H04W 56/00* | (2009.01) |
| *H04W 16/14* | (2009.01) |
| *H04B 17/336* | (2015.01) |

(52) U.S. Cl.
CPC .......... *H04W 24/10* (2013.01); *H04B 17/336* (2015.01); *H04L 5/0051* (2013.01); *H04W 16/14* (2013.01); *H04W 56/0055* (2013.01)

(58) Field of Classification Search
CPC ...... H04W 24/10; H04W 16/14; H04L 5/0051
See application file for complete search history.

(56) References Cited

U.S. PATENT DOCUMENTS

| | | | |
|---|---|---|---|
| 2018/0324683 A1* | 11/2018 | Wittenmark | H04W 74/0808 |
| 2020/0351126 A1* | 11/2020 | Siomina | H04B 17/309 |
| 2021/0037591 A1* | 2/2021 | Niu | H04W 28/06 |
| 2022/0053349 A1* | 2/2022 | Wu | H04L 5/0051 |

* cited by examiner

*Primary Examiner* — Zhiren Qin
(74) *Attorney, Agent, or Firm* — Oblon, McClelland, Maier & Neustadt, L.L.P.

(57) ABSTRACT

Aspects of the disclosure provide apparatuses and methods for wireless communications. One apparatus includes processing circuitry that selects one or more first available radio link monitoring reference signal (RLM-RS) samples from a plurality of received RLM-RS samples based on signal qualities of the one or more first available RLM-RS samples. The one or more first available RLM-RS samples are received within a first evaluation period. The processing circuitry determines whether a total number of the one or more first available RLM-RS samples is less than a target number. When the total number of the one or more first available RLM-RS samples is determined to be less than the target number, the processing circuitry determines a second evaluation period that is greater than the first evaluation period, and performs an RLM procedure in an unlicensed band within the second evaluation period.

20 Claims, 5 Drawing Sheets

RADIO LINK MONITORING (RLM) PROCEDURES IN NEW RADIO UNLICENSED BANDS (NR-U)

INCORPORATION BY REFERENCE

This present application claims the benefits of U.S. Provisional Application No. 62/888,136, "RRM and RLM PROCEDURES in NR-U" filed on Aug. 16, 2019, and U.S. Provisional Application No. 62/910,589, "NR-U RLM" filed on Oct. 4, 2019, which are hereby incorporated by reference in their entirety.

TECHNICAL FIELD

The present disclosure relates generally to wireless communications, and specifically relates to radio link monitoring (RLM) procedures in 5G new radio unlicensed bands (NR-U).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In 5G new radio unlicensed bands (NR-U), a user equipment (UE) (e.g., a cellular smartphone) and a base station (BS) may need to perform listen-before-talk (LBT) to request a transmission opportunity. However, a periodic reference signal, such as a discovery signal (DRS) or a reference signal for radio monitoring link (RLM-RS), may not be transmitted by the BS due to LBT. Therefore, at the UE side (i.e. receiver side), normal operations of radio resource management (RRM) and radio link monitoring (RLM) may be impacted by these missing reference signals.

SUMMARY

Aspects of the disclosure provide a method of wireless communication at a user equipment (UE) that operates in an unlicensed band. Under the method, one or more first available radio link monitoring reference signal (RLM-RS) samples are selected from a plurality of received RLM-RS samples based on signal qualities of the one or more first available RLM-RS samples. The one or more first available RLM-RS samples are received within a first evaluation period. Whether a total number of the one or more first available RLM-RS samples is less than a target number is determined. When the total number of the one or more first available RLM-RS samples is less than the target number, a second evaluation period is determined. The second evaluation period is greater than the first evaluation period. An RLM procedure is performed in the unlicensed band within the second evaluation period.

In an embodiment, the first evaluation period is used for the UE to perform the RLM procedure in a licensed band.

In an embodiment, a signal to noise ratio (SNR) of each of the one or more first available RLM-RS samples is greater than a first threshold.

According to aspects of the disclosure, the second evaluation period is determined based on the first evaluation and an extension factor.

In an embodiment, when the UE is configured to perform in-synchronization measurement, an extended evaluation period is determined based on the first evaluation period and the extension factor. Within the extended evaluation period, one or more second available RLM-RS samples are selected from the plurality of received RLM-RS samples. An SNR of each of the one or more second available RLM-RS samples is greater than the first threshold. Whether a total number of the one or more second available RLM-RS samples is less than the target number is determined. When the total number of the one or more second available RLM-RS samples is less than the target number, the extension factor is increased. When the total number of the one or more second available RLM-RS samples is greater than or equal to the target number, the extended evaluation period is determined as the second evaluation period. Whether a serving cell on the unlicensed band is in-synchronization is determined.

In an embodiment, when the UE is configured to perform out-of-synchronization measurement, whether an SNR of one or more third RLM-RS samples received within a period equal to or greater than the first evaluation period is greater than a second threshold is determined. When the SNR of the one or more third RLM-RS samples is less than the second threshold, the extension factor is set to be a fixed value. When the SNR of the one or more third RLM-RS samples is greater than or equal to the second threshold, an extended evaluation period is determined based on the first evaluation period and the extension factor. Within the extended evaluation period, one or more fourth available RLM-RS samples are selected from the plurality of received RLM-RS samples. An SNR of each of the one or more fourth available RLM-RS samples is greater than the first threshold. Then whether a total number of the one or more fourth available RLM-RS samples is less than the target number is determined. When the total number of the one or more fourth available RLM-RS samples is less than the target number, the extension factor is increased. When the total number of the one or more fourth available RLM-RS samples is greater than or equal to the target number, the extended evaluation period is determined as the second evaluation period. Whether a serving cell on the unlicensed band is out-of-synchronization is determined.

Aspects of the disclosure provide an apparatus for wireless communications. The apparatus operates in an unlicensed band and includes processing circuitry that can select one or more first available radio link monitoring reference signal (RLM-RS) samples from a plurality of received RLM-RS samples based on signal qualities of the one or more first available RLM-RS samples. The one or more first available RLM-RS samples are received within a first evaluation period. The processing circuitry determines whether a total number of the one or more first available RLM-RS samples is less than a target number. The processing circuitry determines a second evaluation period when the total number of the one or more first available RLM-RS samples is determined to be less than the target number. The second evaluation period is greater than the first evaluation period. The processing circuitry performs an RLM procedure in the unlicensed band within the second evaluation period.

Aspects of the disclosure further provide a non-transitory computer-readable medium which stores instructions implementing any one or a combination of the above methods for wireless communication.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Radio link monitoring (RLM) is a procedure to monitor a quality level of a radio link, such as a physical downlink control channel (PDCCH) transmission in new radio (NR). In some cases, the quality level of the PDCCH transmission can be determined by comparing the PDCCH transmission to a hypothetical PDCCH transmission. In addition, RLM may help detect whether the radio link is in-synchronization (INS) or out-of-synchronization (OOS).

A user equipment (UE), such as a cell phone or tablet, may be configured to perform the RLM procedure to determine the quality level of the radio link. In some embodiments, RLM quality can be determined by comparing a selected RLM reference signal (RS), also referred to herein as RLM-RS to a hypothetical PDCCH transmission. Examples of RLM-RS include synchronization signal block (SSB), channel state information-reference signal (CSI-RS), and the like.

Figure 1:
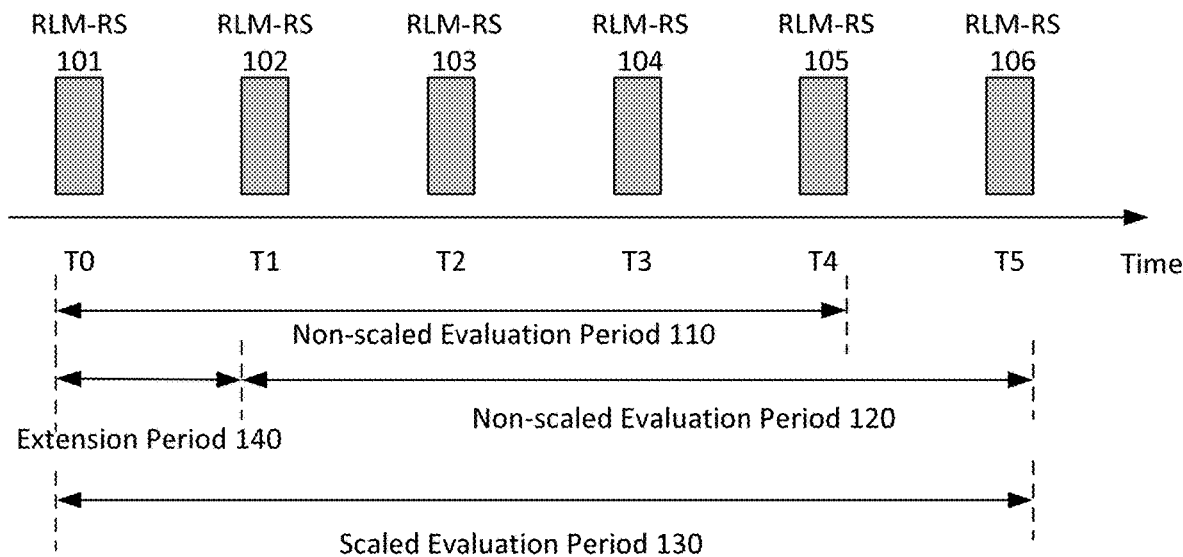
FIG. 1 shows an exemplary radio link monitoring procedure (RLM) according to an embodiment of the disclosure.

FIG. 1 shows an exemplary radio link monitoring procedure (RLM) according to an embodiment of the disclosure. In FIG. 1, the UE can receive a plurality of RLM-RS samples (e.g., RLM-RS samples 101-106) and then evaluate a subset of the plurality of RLM-RS samples. The subset of the plurality of RLM-RS samples are received within an evaluation period. For example, the UE can evaluate RLM-RS samples 101-105 within the non-scaled evaluation period 110 and/or RLM-RS samples 102-106 within the non-scaled evaluation period 120. The number of the evaluated RLM-RS samples may be different for the INS determination and OOS determination. For example, the UE may evaluate 5 and 10 RLM-RS samples for the INS determination and the OOS determination, respectively.

It is noted that the evaluation period that can be used in a licensed band is non-scaled (or non-extended). That is, the evaluation period for the licensed band is fixed.

According to aspects of the disclosure, a variety of parameters can be used in the RLM procedure, such as a threshold value $Q_{IN}$ at which the PDCCH transmission cannot be reliably received, or a threshold value $Q_{OUT}$ at which the PDCCH transmission can be received more reliably. In this example, the threshold value $Q_{IN}$ may correspond to a first block error rate (BLER) of a hypothetical PDCCH that indicates an INS condition of the radio link, while the threshold value $Q_{OUT}$ may correspond to a second BLER that indicates an OOS condition of the radio link. For the INS indication, the UE can evaluate $N_{INS}$ RLM-RS samples, and an INS indication can be sent out if the estimated signal quality of the $N_{INS}$ RLM-RS samples is higher than the threshold value $Q_{IN}$. For the OOS indication, the UE can evaluate $N_{OOS}$ RLM-RS samples, and an OOS indication can be sent out if the estimated signal quality of the $N_{OOS}$ RLM-RS samples is lower than the threshold value $Q_{OUT}$. It is noted that the estimated signal quality can be signal-to-noise-ratio (SNR), signal-to-interference-and-noise-ratio (SINR), reference signal received power (RSRP), reference signal received quality (RSRQ), and the like. In addition, the ways to estimate the signal quality of multiple RLM-RS samples over the evaluation period are not limited. For example, the estimated SNR of multiple RLM-RS samples over the evaluation period can be an average of SNRs of the multiple RLM-RS samples However, in 5G new radio unlicensed band (NR-U), a base station (BS) may perform listen-before-talk (LBT) to request a transmission opportunity. Due to LBT, a periodic reference signal, such as a discovery reference signal (DRS) or an RLM-RS, may not be transmitted from the BS. Therefore, at the UE side, an interference signal may be received and mis-detected as the periodic reference signal, and the normal operation of RLM and/or radio resource management (RRM) may be impacted by these missing or mis-detected reference signals. For example, in the RLM procedure, a decision on whether the UE is in INS/OOS can be impacted.

Figure 2:
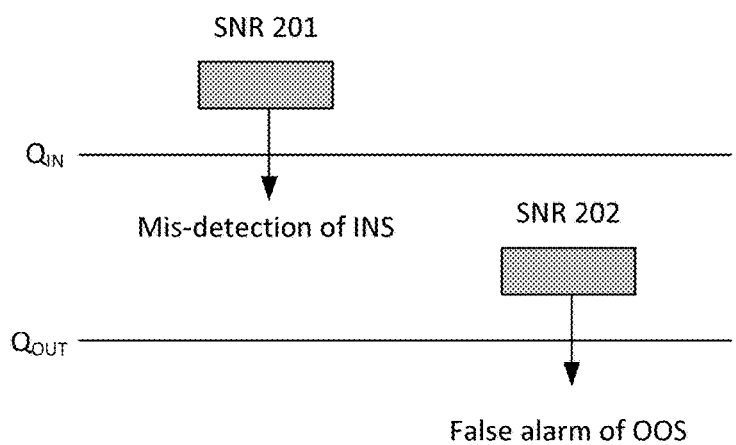
FIG. 2 shows an exemplary inaccurate RLM measurement according to an embodiment of the disclosure.

FIG. 2 shows an exemplary inaccurate RLM measurement according to an embodiment of the disclosure. In FIG. 2, the UE can evaluate the signal quality of multiple received RLM-RS (or DRS) samples by, for example, applying averaging (or weight averaging) on SNRs of the multiple received RLM-RS (or DRS) samples. If one or more interference signals are mis-detected as RLM-RS samples due to LBT, the averaged SNR of the multiple RLM-RS samples may be under-estimated due to relatively low power levels of the one or more interference signals.

In an embodiment, when the UE is configured to perform INS measurement, due to the mis-detected RLM-RS samples, the estimated SNR 201 may be under-estimated and below the threshold value $Q_{IN}$, and thus the INS indication may not be sent out. Accordingly, a mis-detection rate of the INS indication may be increased.

In an embodiment, when the UE is configured to perform OOS measurement, due to the mis-detected RLM-RS samples, the estimated SNR 202 may be under-estimated and below the threshold value $Q_{OUT}$, and thus the OOS indication may be sent out. Accordingly, a false alarm rate of the OOS indication may be increased.

From the above examples, it can be seen that the non-scaled (or non-extended) evaluation period that is used in the licensed band may not be applicable to NR-U because some interference signals may be mis-detected as RLM-RS samples within the non-scaled evaluation period.

This disclosure presents methods for improving the RLM procedure in NR-U.

According to aspects of the disclosure, the non-scaled evaluation period can be extended by an extension factor K to be a scaled evaluation (or extended) period for the RLM procedure in NR-U. The scaled evaluation period for NR-U can be greater than the non-scaled evaluation period for the licensed band. That is, the scaled evaluation period can include the non-scaled period and an extension period that is determined by the extension factor K, so that if an interference signal is mis-detected as an RLM-RS sample within the non-scaled evaluation period, an additional RLM-RS sample may be received and evaluated within the extension period. Accordingly, the mis-detection rate of the INS indication and/or the false alarm rate of the OOS indication can be reduced.

According to aspects of the disclosure, in order to perform the RLM procedure, within the non-scaled evaluation period, a plurality of available (or qualified) RLM-RS samples are first selected based on signal qualities of the plurality of available RLM-RS samples. For example, an SNR (or SINR, RSRP, RSRQ, and the like) of each of the plurality of available RLM-RS samples needs to be greater than a threshold (i.e. the first threshold). In addition, a total number of the plurality of available RLM-RS samples needs to be greater than or equal to a target number. If the total number of the plurality of available RLM-RS samples is less than the target number, a scaled evaluation period is determined for the UE to perform the RLM procedure. The scaled evaluation period includes the non-scaled evaluation period and the extension period that is determined by the extension factor K.

Referencing back to FIG. 1, the scaled evaluation period 130 includes the non-scaled evaluation period 120 and the extension period 140. It is assumed that the target number is 5. In addition, the SNRs of the RLM-RS samples 101-105 are above the threshold and the SNR of the RLM-RS sample 106 is below the threshold. Therefore, the available RLM-RS samples within the non-scaled evaluation period 120 are the RLM-RS samples 102-105, and the total number of the available RLM-RS samples within the non-scaled evaluation period 120 is 4, which is less than the target number. Then the UE can evaluate the RLM-RS 101 within the extension period 140, the SNR of which is above the threshold. In some embodiments, if the SNR of the RLM-RS 101 is below the threshold, the extension period can be increased until an available RLM-RS is found.

In the above embodiment, the extension factor K is variable. However, the extension factor K can be predefined as a fixed value in other embodiments.

In an embodiment, if the target number is N, and within the scaled evaluation period the UE can receive and evaluate N+K RLM-RS samples, then the UE can select N available RLM-RS samples from the N+K received RLM-RS samples for the RLM procedure in NR-U. For example, if N=10 and K=2, the UE can select 10 available RLM-RS samples from 12 received RLM-RS samples for the RLM procedure in NR-U.

In an embodiment, if the target number is N, and within the scaled evaluation period the UE can receive and evaluate K*N RLM-RS samples, then the UE can select N available RLM-RS sample from the K*N received RLM-RS samples for the RLM procedure in NR-U. For example, if N=10 and K=1.2, the UE can select 10 available RLM-RS samples from 12 received RLM-RS samples for the RLM procedure in NR-U.

It is noted that in the above embodiments, the selection of the available RLM-RS samples can be based on a sorting of the (or SINR, RSRP, RSRQ, and the like) of the received RLM-RS samples. In addition, the extension factor K can be different for the INS/OOS indications (e.g., K=1 for INS and K=2 for OOS, or K=1.2 for INS and K=1.3 for OOS).

Table 1 lists some exemplary evaluation periods for the RLM procedure in NR-U.

TABLE 1

| Configuration | $T_{Evaluate\_out\_SSB}$ (ms) | $T_{Evaluate\_in\_SSB}$ (ms) |
|---|---|---|
| no DRX | max(200, ceil((10 + $K_{OOS}$)*P)*$T_{SSB}$) | max(100, ceil((5 + $K_{INS}$)*P)*$T_{SSB}$) |
| DRX cycle ≤320 ms | max(200, ceil((15 + $K_{OOS}$)*P)*max($T_{DRX}$, $T_{SSB}$)) | max(100, ceil((7.5 + $K_{INS}$)*P)*max($T_{DRX}$, $T_{SSB}$)) |
| DRX cycle >320 ms | ceil((10 + $K_{OOS}$)*P)*$T_{DRX}$ | ceil((5 + $K_{INS}$)*P)*$T_{DRX}$ |

In Table 1, when there is no discontinuous reception (DRX) cycle, for the OOS indication, the evaluation period $T_{Evaluate\_out\_SSB}$=max(200 ms, ceil((10+$K_{oos}$)*P)*$T_{SSB}$), while for the INS indication, the evaluation period $T_{Evaluate\_in\_SSB}$=max(100 ms, ceil((5+$K_{INS}$)*P)*$T_{SSB}$), where max( ) is a maximum function that finds the largest value among inputs of the maximum function, ceil( ) is a ceiling function that returns the least integer that is greater than or equal to an input of the ceiling function, $K_{OOS}$ is the extension factor for the OOS indication, $K_{INS}$ is the extension factor for the INS indication, P is a sharing factor between RLM-RS measurement and gaps, and $T_{SSB}$ is a periodicity of SSB configured for RLM.

When the DRX cycle is not greater than 320 ms, for the OOS indication, the evaluation period $T_{Evaluate\_out\_SSB}$=max (200 ms, ceil((15+$K_{oos}$)*P)*max($T_{DRX}$, $T_{SSB}$)), while for the INS indication, the evaluation period $T_{Evaluate\_in\_SSB}$=max (100 ms, ceil((7.5+$K_{INS}$)*P)*max($T_{DRX}$, $T_{SSB}$)), where $T_{DRX}$ is the DRX cycle length.

When the DRX cycle is greater than 320 ms, for the OOS indication, the evaluation period $T_{Evaluate\_out\_SSB}$=ceil((10+ $K_{oos}$)*P)*$T_{DRX}$, while for the INS indication, the evaluation period $T_{Evaluate\_in\_SSB}$=ceil((5+$K_{INS}$)*P)*$T_{DRX}$.

In some embodiments, whether the extension factor K is predefined or variable is dependent on a comparison between the SNR of multiple RLM-RS samples and an SNR threshold (i.e. the $2^{nd}$ threshold). In an embodiment, if the SNR of the multiple received RLM-RS samples is greater than the SNR threshold, the extension factor K can be variable. In an embodiment, if the SNR of the multiple received RLM-RS samples is less than the SNR threshold, the extension factor K can be predefined. In an embodiment, the SNR threshold can be the threshold value $Q_{IN}$ or the threshold value $Q_{OUT}$ or a value between $Q_{IN}$ and $Q_{OUT}$.

In an embodiment, the extension factor K is constrained by a maximum extension factor $K_{MAX}$, i.e., K≤$K_{MAX}$.

Figure 3:
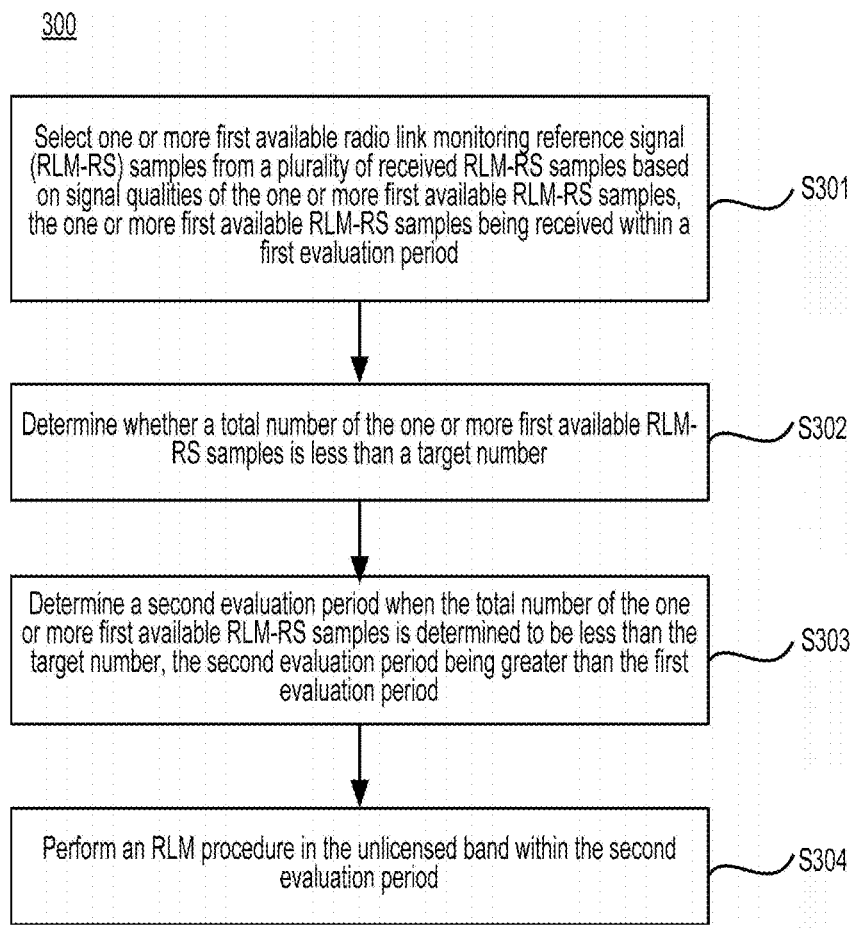
FIG. 3 shows a flowchart outlining an exemplary process according to embodiments of the disclosure.

FIG. 3 shows a flowchart outlining an exemplary process 300 according to embodiments of the disclosure. In various embodiments, the UE may be configured to perform INS measurement and/or OOS measurement, and the process 300 is executed by processing circuitry, such as processing circuitry in the UE that operates in NR-U. In some embodiments, the process 300 is implemented in software instructions, thus when the processing circuitry executes the software instructions, the processing circuitry performs the process 300.

The process 300 may generally start at step S301, where the process 300 selects one or more first available RLM-RS samples from a plurality of received RLM-RS samples based on signal qualities of the one or more first available RLM-RS samples. The one or more first available RLM-RS samples are received within a first evaluation period. Then, the process 300 proceeds to step S302.

At step S302, the process 300 determines whether a total number of the one or more first available RLM-RS samples is less than a target number. Then, the process 300 proceeds to step S303.

At step S303, the process 300 determines a second evaluation period when the total number of the one or more first available RLM-RS samples is determined to be less than the target number. The second evaluation period is greater than the first evaluation period. Then, the process 300 proceeds to step S304.

At step S304, the process 300 performs an RLM procedure in the unlicensed band within the second evaluation period. Then, the process 300 terminates.

In an embodiment, the first evaluation period is used for the UE to perform the RLM procedure in a licensed band.

In an embodiment, an SNR of each of the one or more first available RLM-RS samples is greater than a first threshold.

In an embodiment, the second evaluation period is determined based on the first evaluation and an extension factor.

In an embodiment, the process 300 determines whether a serving cell on the unlicensed band is in-synchronization (INS).

In an embodiment, the process 300 determines whether a serving cell on the unlicensed band is out-of-synchronization (OOS).

Figure 4:
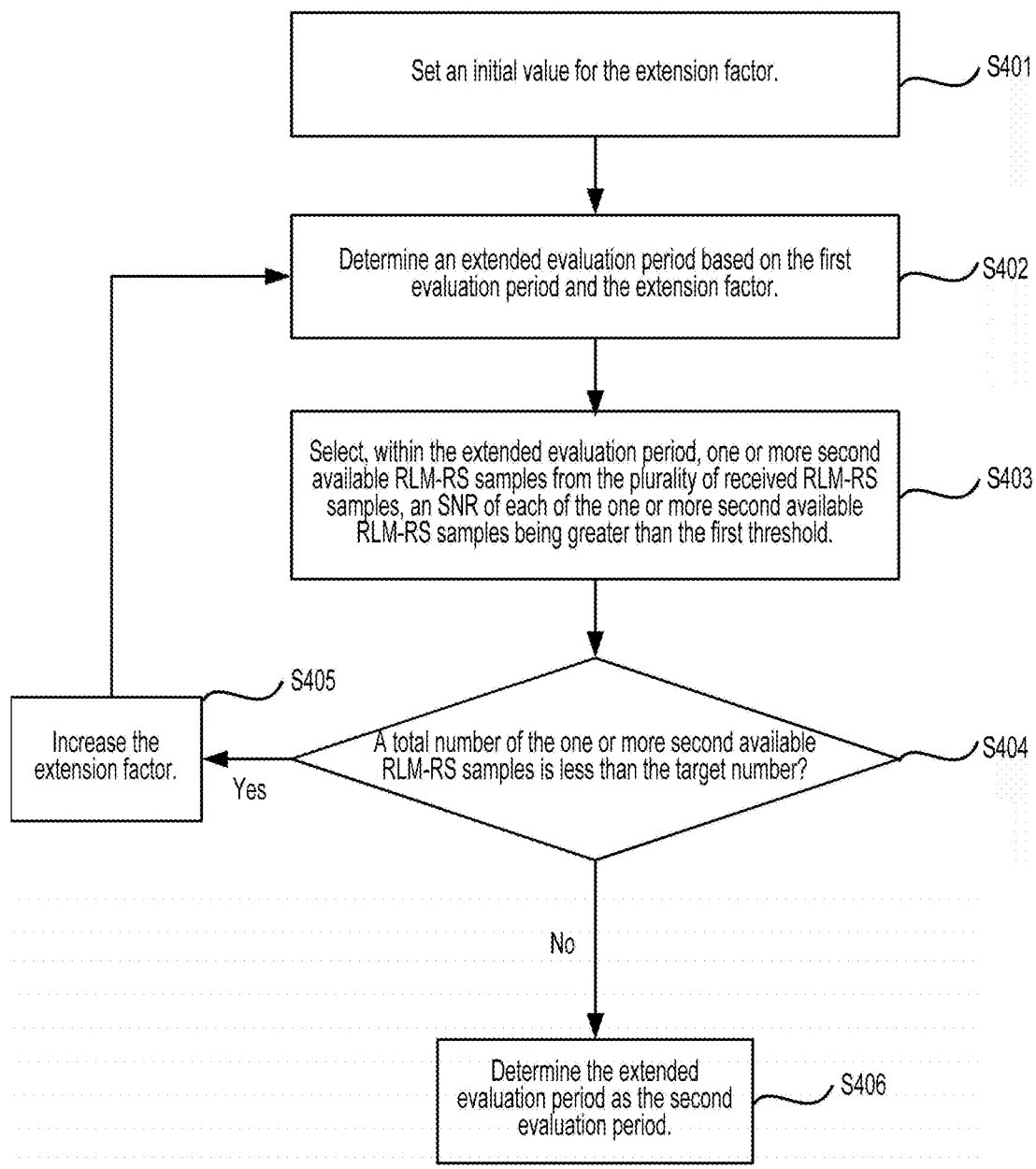
FIG. 4 shows a flowchart outlining an exemplary process according to an embodiment of the disclosure.

FIG. 4 shows a flowchart outlining an exemplary process 400 according to an embodiment of the disclosure. In this embodiment, the UE may be configured to perform INS measurement and/or OOS measurement. The process 400 may generally start at step S401, where the process 400 sets an initial value for the extension factor. Then, the process 400 proceeds to step S402.

At step S402, the process 400 determines an extended evaluation period based on the first evaluation period and the extension factor. Then, the process 400 proceeds to step S403.

At step S403, the process 400 selects, within the extended evaluation period, one or more second available RLM-RS samples from the plurality of received RLM-RS samples. An SNR of each of the one or more second available RLM-RS samples is greater than the first threshold. Then, the process 400 proceeds to step S404.

At step S404, the process 400 determines whether a total number of the one or more second available RLM-RS samples is less than the target number. If the total number of the one or more second available RLM-RS samples is determined to be less than the target number, the process 400 proceeds to step S405. Otherwise, the process 400 proceeds to step S406.

At step S405, the process 400 increases the extension factor. Then, the process 400 proceeds to step S402.

At step S406, the process 400 determines the extended evaluation period as the second evaluation period. Then, the process 400 terminates.

In an embodiment, the process 400 determines whether a serving cell on the unlicensed band is in-synchronization (INS).

In an embodiment, the process 400 determines whether a serving cell on the unlicensed band is out-of-synchronization (OOS).

Figure 5:
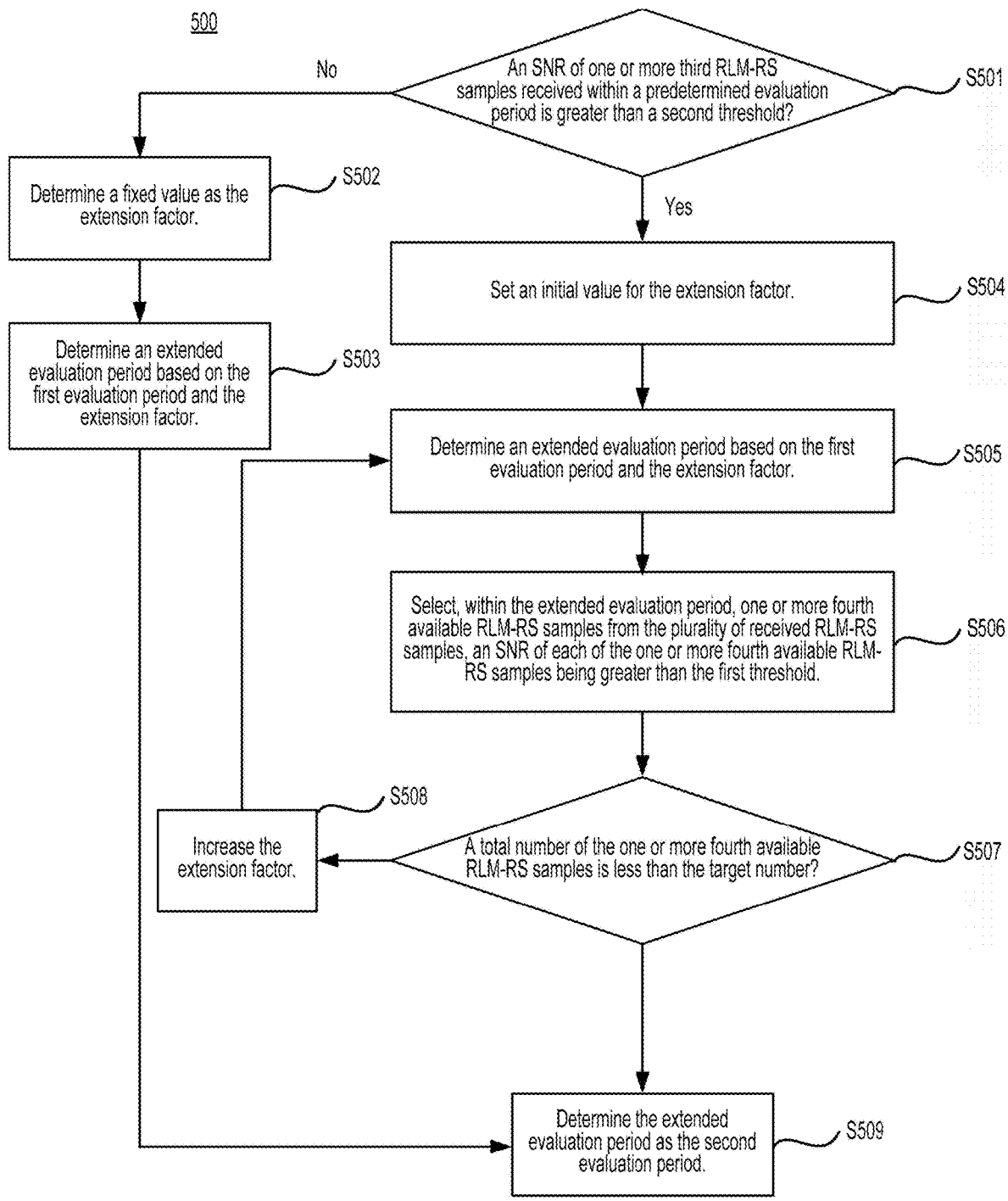
FIG. 5 shows a flowchart outlining an exemplary process according to an embodiment of the disclosure.

FIG. 5 shows a flowchart outlining an exemplary process 500 according to an embodiment of the disclosure. In this embodiment, the UE may be configured to perform INS measurement and/or OOS measurement. The process 500 may generally start at step S501, where the process 500 determines whether an SNR of one or more third RLM-RS samples received within a predetermined period is greater than a second threshold. The predetermined period is equal to or greater than the first evaluation period. For example, the predetermined period is the first evaluation period or the maximum extension of the RLM evaluation period. If the SNR of the one or more third RLM-RS samples received within the predetermined period is determined to be less than a second threshold, the process 500 proceeds to step S502. Otherwise, the process 500 proceeds to step S504.

At step S502, the process 500 determines a fixed value as the extension factor. The, the process 500 proceeds to step S503.

At step S503, the process 500 determines an extended evaluation period based on the first evaluation period and the extension factor. Then, the process 500 proceeds to step S509.

At step S504, the process 500 sets an initial value for the extension factor. Then, the process 500 proceeds to step S505.

At step S505, the process 500 determines an extended evaluation period based on the first evaluation period and the extension factor. Then, the process 500 proceeds to step S506.

At step S506, the process 500 selects, within the extended evaluation period, one or more fourth available RLM-RS samples from the plurality of received RLM-RS samples. An SNR of each of the one or more fourth available RLM-RS samples is greater than the first threshold. Then, the process 500 proceeds to step S507.

At step S507, the process 500 determines whether a total number of the one or more fourth available RLM-RS samples is less than the target number. If the total number of the one or more fourth available RLM-RS samples is determined to be less than the target number, the process 500 proceeds to step S508. Otherwise, the process 500 proceeds to step S509.

At step S508, the process 500 increases the extension factor. Then, the process 500 proceeds to step S505.

At step S509, the process 500 determines the extended evaluation period as the second evaluation period. Then, the process 500 terminates.

In an embodiment, the process 500 determines whether a serving cell on the unlicensed band is in-synchronization (INS).

In an embodiment, the process 500 determines whether a serving cell on the unlicensed band is out-of-synchronization (OOS).

Figure 6:
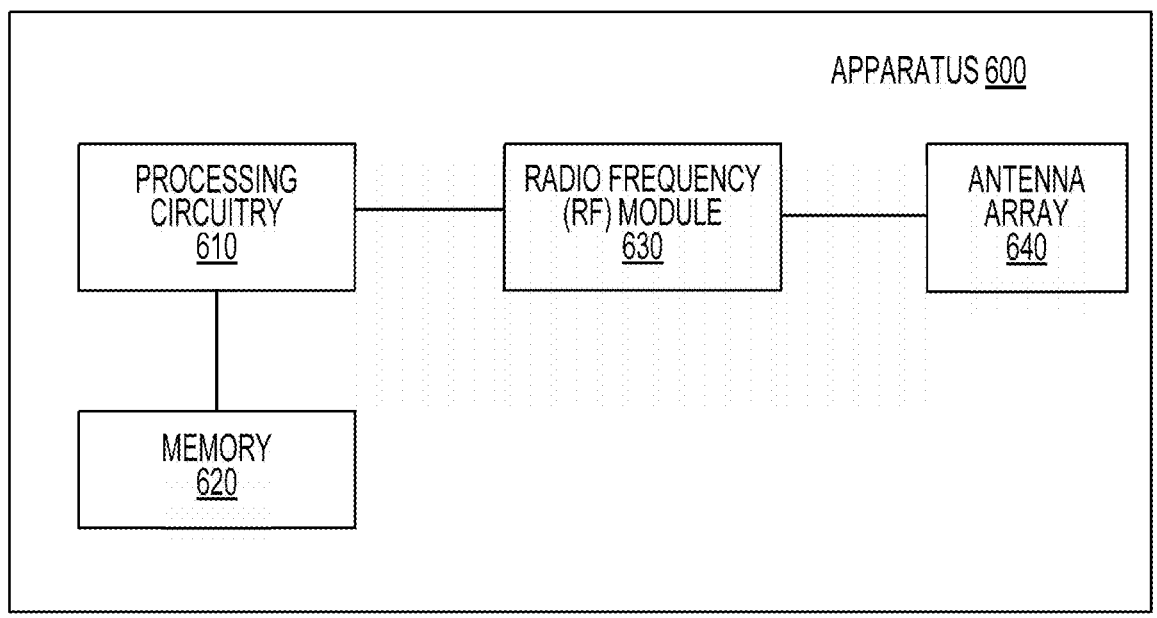
FIG. 6 shows an exemplary apparatus according to embodiments of the disclosure.

FIG. 6 shows an exemplary apparatus 600 according to embodiments of the disclosure. The apparatus 600 can be configured to perform various functions in accordance with one or more embodiments or examples described herein. Thus, the apparatus 600 can provide means for implementation of techniques, processes, functions, components, and systems described herein. For example, the apparatus 600 can be used to implement functions of the UE in various embodiments and examples described herein. The apparatus 600 can include a general purpose processor or specially designed circuits to implement various functions, components, or processes described herein in various embodiments. The apparatus 600 can include processing circuitry 610, a memory 620, a radio frequency (RF) module 630, and an antenna array 640.

In various examples, the processing circuitry 610 can include circuitry configured to perform the functions and processes described herein in combination with software or without software. In various examples, the processing circuitry 610 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 610 can be a central processing unit (CPU) configured to execute program instructions to perform various functions and processes described herein. Accordingly, the memory 620 can be configured to store program instructions. The processing circuitry 610, when executing the program instructions, can perform the functions and processes. The memory 620 can further store other programs or data, such as operating systems, application programs, and the like. The memory 620 can include a read only memory (ROM), a random access memory (RAM), a flash memory, a solid state memory, a hard disk drive, an optical disk drive, and the like.

The RF module 630 receives a processed data signal from the processing circuitry 610 and converts the data signal to a wireless signal that is then transmitted via the antenna array 640, or vice versa. The RF module 630 can include a digital to analog convertor (DAC), an analog to digital converter (ADC), a frequency up convertor, a frequency down converter, filters and amplifiers for reception and transmission operations. The RF module 630 can include multi-antenna circuitry for beamforming operations. For example, the multi-antenna circuitry can include an uplink spatial filter circuit, and a downlink spatial filter circuit for shifting analog signal phases or scaling analog signal amplitudes.

The apparatus 600 can optionally include other components, such as input and output devices, additional or signal processing circuitry, and the like. Accordingly, the apparatus 600 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of wireless communication at a user equipment (UE), the method comprising:
   selecting one or more first available radio link monitoring reference signal (RLM-RS) samples from a plurality of received RLM-RS samples based on signal qualities of the one or more first available RLM-RS samples, the one or more first available RLM-RS samples being received within a first evaluation period;
   determining whether a total number of the one or more first available RLM-RS samples is less than a target number;
   when the total number of the one or more first available RLM-RS samples is determined to be less than the target number,
      determining a second evaluation period that is greater than the first evaluation period; and
      performing an RLM procedure in an unlicensed band within the second evaluation period.

2. The method of claim 1, further comprising:
   performing the RLM procedure in a licensed band within the first evaluation period.

3. The method of claim 1, wherein a signal to noise ratio (SNR) of each of the one or more first available RLM-RS samples is greater than a first threshold.

4. The method of claim 1, wherein the determining the second evaluation period further comprises:
   determining the second evaluation period based on the first evaluation and an extension factor.

5. The method of claim 4, wherein the determining the second evaluation period further comprises:
   determining an extended evaluation period based on the first evaluation period and the extension factor;
   selecting, within the extended evaluation period, one or more second available RLM-RS samples from the plurality of received RLM-RS samples, an SNR of each of the one or more second available RLM-RS samples being greater than the first threshold;
   determining whether a total number of the one or more second available RLM-RS samples is less than the target number;
   when the total number of the one or more second available RLM-RS samples is determined to be less than the target number,
      increasing the extension factor; and
   when the total number of the one or more second available RLM-RS samples is determined to be greater than or equal to the target number,
      determining the extended evaluation period as the second evaluation period.

6. The method of claim 5, wherein the performing the RLM procedure further comprises:
   determining whether a serving cell on the unlicensed band is in-synchronization (INS).

7. The method of claim 4, wherein the determining the second evaluation period further comprises:
   determining whether an SNR of one or more third RLM-RS samples received within a period equal to or greater than the first evaluation period is greater than a second threshold.

8. The method of claim 7, further comprising:
when the SNR of the one or more third RLM-RS samples is determined to be less than the second threshold,
setting the extension factor to be a fixed value;
determining an extended evaluation period based on the first evaluation period and the extension factor; and
determining the extended evaluation period as the second evaluation period.

9. The method of claim 7, further comprising:
when the SNR of the one or more third RLM-RS samples is determined to be greater than or equal to the second threshold,
determining an extended evaluation period based on the first evaluation period and the extension factor;
selecting, within the extended evaluation period, one or more fourth available RLM-RS samples from the plurality of received RLM-RS samples, an SNR of each of the one or more fourth available RLM-RS samples being greater than the first threshold;
determining whether a total number of the one or more fourth available RLM-RS samples is less than the target number;
when the total number of the one or more fourth available RLM-RS samples is determined to be less than the target number,
increasing the extension factor; and
when the total number of the one or more fourth available RLM-RS samples is determined to be greater than or equal to the target number,
determining the extended evaluation period as the second evaluation period.

10. The method of claim 7, wherein the performing the RLM procedure further comprises:
determining whether a serving cell on the unlicensed band is out-of-synchronization (OOS).

11. An apparatus comprising processing circuitry configured to:
select one or more first available radio link monitoring reference signal (RLM-RS) samples from a plurality of received RLM-RS samples based on signal qualities of the one or more first available RLM-RS samples, the one or more first available RLM-RS samples being received within a first evaluation period;
determine whether a total number of the one or more first available RLM-RS samples is less than a target number;
when the total number of the one or more first available RLM-RS samples is determined to be less than the target number,
determine a second evaluation period that is greater than the first evaluation period; and
perform an RLM procedure in an unlicensed band within the second evaluation period.

12. The apparatus of claim 11, wherein the processing circuitry is further configured to:
perform the RLM procedure in a licensed band within first evaluation period.

13. The apparatus of claim 11, wherein a signal to noise ratio (SNR) of each of the one or more first available RLM-RS samples is greater than a first threshold.

14. The apparatus of claim 11, wherein the processing circuitry is further configured to:
determine the second evaluation period based on the first evaluation and an extension factor.

15. The apparatus of claim 14, wherein the processing circuitry is further configured to:
determine an extended evaluation period based on the first evaluation period and the extension factor;
select, within the extended evaluation period, one or more second available RLM-RS samples from the plurality of received RLM-RS samples, an SNR of each of the one or more second available RLM-RS samples being greater than the first threshold;
determine whether a total number of the one or more second available RLM-RS samples is less than the target number;
when the total number of the one or more second available RLM-RS samples is determined to be less than the target number,
increase the extension factor; and
when the total number of the one or more second available RLM-RS samples is determined to be greater than or equal to the target number,
determine the extended evaluation period as the second evaluation period.

16. The apparatus of claim 15, wherein the processing circuitry is further configured to:
determine whether a serving cell on the unlicensed band is in-synchronization (INS).

17. The apparatus of claim 14, wherein the processing circuitry is further configured to:
determine whether an SNR of one or more third RLM-RS samples received within a period equal to or greater than the first evaluation period is greater than a second threshold.

18. The apparatus of claim 17, wherein the processing circuitry is further configured to:
when the SNR of the one or more third RLM-RS samples is determined to be less than the second threshold,
set the extension factor to be a fixed value;
determine an extended evaluation period based on the first evaluation period and the extension factor; and
determine the extended evaluation period as the second evaluation period.

19. The apparatus of claim 17, wherein the processing circuitry is further configured to:
when the SNR of the one or more third RLM-RS samples is determined to be greater than or equal to the second threshold,
determine an extended evaluation period based on the first evaluation period and the extension factor;
select, within the extended evaluation period, one or more fourth available RLM-RS samples from the plurality of received RLM-RS samples, an SNR of each of the one or more fourth available RLM-RS samples being greater than the first threshold;
determine whether a total number of the one or more fourth available RLM-RS samples is less than the target number;
when the total number of the one or more fourth available RLM-RS samples is determined to be less than the target number,
increase the extension factor; and
when the total number of the one or more fourth available RLM-RS samples is determined to be greater than or equal to the target number,
determine the extended evaluation period as the second evaluation period.

20. The apparatus of claim 17, wherein the processing circuitry is further configured to:
  determine whether a serving cell on the unlicensed band is out-of-synchronization (OOS).

* * * * *